United States Patent
Schlecht (10) Patent No.: US 12,479,565 B2
(45) Date of Patent: Nov. 25, 2025

(54) WING ARRANGEMENT COMPRISING A MAIN WING AND A SLAT ATTACHED THERETO OPPOSITE A FLOW DIRECTION IN FRONT OF THE MAIN WING

(71) Applicant: Paul-Matthias Schlecht, Böblingen (DE)

(72) Inventor: Paul-Matthias Schlecht, Böblingen (DE)

(73) Assignee: Paul-Matthias Schlecht, Boblingen (DE)

( * ) Notice: Subject to any disclaimer, the term of this patent is extended or adjusted under 35 U.S.C. 154(b) by 0 days.

(21) Appl. No.: 18/844,089

(22) PCT Filed: Sep. 7, 2023

(86) PCT No.: PCT/EP2023/074674
§ 371 (c)(1),
(2) Date: Sep. 5, 2024

(87) PCT Pub. No.: WO2024/052505
PCT Pub. Date: Mar. 14, 2024

(65) Prior Publication Data
US 2025/0178715 A1    Jun. 5, 2025

(30) Foreign Application Priority Data
Sep. 9, 2022 (DE) .................. 10 2022 123 020.1

(51) Int. Cl.
*B64C 3/40* (2006.01)
*B64C 3/16* (2006.01)

(52) U.S. Cl.
CPC . *B64C 3/16* (2013.01); *B64C 3/40* (2013.01)

(58) Field of Classification Search
None
See application file for complete search history.

(56) References Cited

U.S. PATENT DOCUMENTS

| 4,285,482 A | 8/1981 | Lewis | |
| 5,056,741 A * | 10/1991 | Bliesner | B64C 9/24 |
| | | | 244/210 |

(Continued)

FOREIGN PATENT DOCUMENTS

| AT | 10992 U1 | 2/2010 |
| DE | 694916 A | 11/1942 |

(Continued)

OTHER PUBLICATIONS

English language Abstract of FR2902756A1.

(Continued)

*Primary Examiner* — Timothy D Collins
*Assistant Examiner* — Terri L Filosi
(74) *Attorney, Agent, or Firm* — William J. Barber; WARE FRESSOLA MAGUIRE & BARBER LLP (57) ABSTRACT

The invention relates to a wing arrangement (10) comprising a main wing (12) and a slat (14) attached thereto opposite a flow direction (22) in front of the main wing (12). A gap (16) with a flow inlet (18) and a defined flow outlet (20) is formed between the slat (14) and the main wing (12). It is suggested that, in a vertical cross-section viewed along the flow direction (22), a length (D) of a section (32) of the slat (14) extending forwards beyond a length (A) of the main wing (12) opposite the flow direction (22) is at least 20% of a total length (C) of the wing arrangement (10) in the flow direction (22).

21 Claims, 3 Drawing Sheets

(56) References Cited

U.S. PATENT DOCUMENTS

| | | |
|---|---|---|
| 2005/0042091 A1 | 2/2005 | Torok et al. |
| 2006/0169847 A1* | 8/2006 | Konings ................ B64C 9/26 244/214 |
| 2009/0108142 A1 | 4/2009 | Wright et al. |
| 2012/0187253 A1* | 7/2012 | Dodd .................... B64C 9/26 244/214 |
| 2015/0211487 A1 | 7/2015 | Dixon et al. |
| 2020/0115040 A1 | 4/2020 | Giannini |

FOREIGN PATENT DOCUMENTS

| | | |
|---|---|---|
| EP | 0 297 321 A1 | 1/1989 |
| EP | 2 383 465 A1 | 11/2011 |
| EP | 2 647 836 A2 | 10/2013 |
| FR | 2 902 756 A1 | 12/2007 |
| WO | 2005023645 A1 | 3/2005 |
| WO | 2013/060722 A1 | 5/2013 |

OTHER PUBLICATIONS

English language Abstract of EP0297321A1.
English language Abstract of AT10992U1.
English language Abstract of DE694916A.

\* cited by examiner

WING ARRANGEMENT COMPRISING A MAIN WING AND A SLAT ATTACHED THERETO OPPOSITE A FLOW DIRECTION IN FRONT OF THE MAIN WING

The present invention relates to a wing arrangement comprising a main wing and a slat attached thereto opposite a flow direction in front of the main wing. A gap with a flow inlet and a defined flow outlet is formed between the slat and the main wing.

Such wing arrangements are known from the prior art, for example in the form of aeroplane wings. One example of such an aircraft with a fixed slat is the Fieseler Fi 156 Storch from Gerhard Fieseler Werke, Kassel, Germany. Wings with a fixed slat achieve a higher acceleration of an air stream flowing in the direction of flow on the upper side of the main wing, so that a stronger lift can be achieved at low speeds of the aircraft and ultimately a take-off and landing of the aircraft at lower speeds. Aircraft with a fixed slat have a gap between the slat and the main wing with flow inlet and outlet dimensions that are always the same. The problem here is that the fixed slat causes a relatively high air resistance, so that the aircraft can only achieve a relatively low cruising speed.

Aircraft with movable slats are also known from the prior art. One example of such an aircraft is the Airbus A300. Here, a nose of the main wing, which is formed on a front section of the main wing in the direction of flow, is moved forwards and/or downwards opposite the direction of flow so that a gap of variable dimensions is formed between the nose and the main wing. Another example is the Boeing 747, which has so-called Krüger flaps. Here, a lower section of the main wing is moved downwards and forwards opposite the direction of flow, so that the surface of the main wing is extended forwards. In these cases, a section of the main wing acts as a movable slat. The movable section is usually extended during take-off or landing of the aircraft in order to achieve—usually together with other aerodynamic lift aids, e.g., landing flaps, etc. —an increased lift of the aircraft at lower speeds.

Based on the described state of the art, the present invention has the object of creating a simple and cost-effective way of accelerating an air stream flowing in the direction of flow on an upper side of the main wing, without at the same time increasing the air resistance excessively.

To solve this object, a wing arrangement with the features of claim 1 is proposed. In particular, based on the wing arrangement of the above-mentioned kind, it is suggested that, viewed in a vertical cross-section along the direction of flow, a length of a section of the slat extending forwards opposite the direction of flow beyond a length of the main wing is at least 20% of a total length of the wing arrangement in the direction of flow.

This can be achieved by the slat having a relatively long extension in the direction of flow. In particular, the slat extends opposite the direction of flow so far beyond a front section of the main wing that the length (D) of the section of the slat extending forwards opposite the direction of flow beyond the length (A) of the main wing is at least 20% of a total length (C) of the wing arrangement, comprising the main wing and the slat, in the direction of flow.

A vertical cross-section in the sense of the present invention refers to a profile section through the wing arrangement, which runs perpendicular to a longitudinal extension of the wing arrangement. The term wing arrangement merely clarifies that it consists of a main wing and a slat. This term does not refer to the orientation of the wing surfaces in relation to the fuselage.

The configuration of the wing arrangement according to the invention leads to a particularly strong acceleration of the airflow on the upper side of the main wing. As a result, the main wing can be made thinner in a vertical cross-section along the direction of flow, which in turn leads to lower air resistance. The profile of the main wing can be made narrower in the vertical cross-section. The curvature of the main wing can be made smaller than in conventional wing arrangements with a main wing and a slat attached thereto.

Due to the relatively large dimensions of the slat compared to the wing arrangements known from the prior art and the relatively small dimensions of the main wing, a relatively high cruising speed can be achieved when using the wing arrangement as a wing for an aircraft.

Nevertheless, a relatively high lift at low speeds can be achieved by the wing arrangement when used as a wing for an aircraft, which is particularly advantageous when the aircraft is taking off and landing. This applies in particular to high angles of attack in slow flight.

The slat extends over the entire length or only part of the length of the main wing. For aeroplanes that are intended to have a short take-off or landing distance, the slat preferably extends over the entire length of the main wing. In the case of aircraft that are intended to have a higher cruising speed, the slat can only extend over part of the length of the main wing, preferably only on the outer sides, i.e., at the wing tips, of the main wings. The arrangement of the slats on the outer sides has the advantage that the aircraft is easier to control in slow flight due to the longer lever.

Viewed in a vertical cross-section along the direction of flow, the slat preferably extends relatively far over the main wing. Unlike in the prior art, where the known slats are only arranged in front of a front section of the main wing, in the invention the slat is also arranged in front of the front section of the main wing, but its rear section extends beyond a front section of the main wing. In particular, the flow outlet is formed between an upper side of the main wing and a lower side of the slat. To this end, it is proposed that, viewed in a vertical cross-section along the direction of flow, the sum of a length (B) of the slat in the direction of flow and the length (A) of the main wing is greater than the total length (C) of the wing arrangement in the direction of flow. The total length is shorter than the sum of the lengths of the main wing and slat, since the slat is arranged at least partially above the main wing or overlaps it.

According to an advantageous further embodiment of the invention, it is proposed that, viewed in a vertical cross-section along the direction of flow, a length (B) of the slat in the direction of flow is at least 50% of the length (A) of the main wing in the direction of flow. Preferably, the length (B) of the slat is between 50% and 80% of the length (A) of the main wing.

As a further solution to the object of the present invention, it is proposed that a nose of the main wing, which is formed on a front section of the main wing opposite to the direction of flow, is designed to be movable with respect to a fixed rear section of the main wing arranged behind the nose in the direction of flow, in order to vary the size of the flow inlet. The wing arrangement can also be designed in such a way that, viewed in a vertical cross-section along the flow direction, a length of a section of the slat extending forwards beyond a length of the main wing in the opposite direction to the flow direction is at least 20% of a total length of the wing arrangement in the flow direction. However, the claimed wing arrangement according to claim 4 also has the stated advantages if, viewed in a vertical cross-section along the direction of flow, a length of a section of the slat extending forwards opposite the direction of flow beyond a length of the main wing is not at least 20% of a total length of the wing arrangement, but less.

The movable nose of the main wing has the advantage, for example when the wing arrangement is used as the wing of an aircraft, that—even when the slat is fixed to a fixed section of the main wing, i.e., when the slat is fixed and not adjustable—it is possible to switch an operating mode of the aircraft between a take-off or landing mode and a cruising mode of an aircraft. When the nose is moved away from the slat (i.e., lowered), the flow inlet of the gap between the slat and the main wing is enlarged. A Bernoulli effect realised by the air flow through the gap is amplified. The aircraft can be flown with a higher angle of attack when landing, which enables a steeper descent. The sink rate of the aircraft can be adjusted by lowering the nose of the main wing. In addition, the wing arrangement can also have conventional landing flaps known from the prior art, in particular on a section of the main wing at the rear in the direction of flow. Lowering the nose thus allows lower speeds of an aircraft during take-off and landing. During cruise operation of the aircraft, the nose is preferably fully retracted, i.e., moved in the direction of the slat.

It is further proposed that during movement of the nose of the main wing, the size of the flow outlet remains unchanged. In particular, the size of the flow outlet is defined as the distance between an underside of the slat and an upper side of the main wing at a rear section of the slat in the direction of flow. The distance is preferably measured in a vertical cross-section through the wing arrangement, which runs parallel to the direction of air flow through the air gap. In other words, the gap always remains the same regardless of the movement of the nose of the main wing.

According to a preferred embodiment of the invention, it is proposed that during the movement of the nose, an upper side of the main wing always has a continuous course when viewed in a vertical cross-section along the direction of flow. In contrast to the prior art, where a front movable section of a main wing is moved forwards and/or downwards away from a fixed section of the main wing, which leads to discontinuities in the course of the upper side of the main wing or to the formation of a trailing edge between the movable and the fixed section of the main wing and air turbulence, in the invention the upper side of the main wing remains curved independently of a movement of the nose of the main wing. By moving the nose, only the Bernoulli effect in the gap between the slat and the main wing is varied, i.e., increased when the nose is lowered and reduced when the nose is retracted.

As a further solution to the object of the present invention, it is proposed that a rear section of the slat in the direction of flow is arranged above a fixed section of the main wing. The wing arrangement can also be designed such that, viewed in a vertical cross-section along the direction of flow, a length of a section of the slat extending forwards beyond a length of the main wing in the opposite direction to the direction of flow is at least 20% of a total length of the wing arrangement in the direction of flow. Furthermore, the wing arrangement can also be designed such that a nose of the main wing formed on a front section of the main wing in the direction of flow is designed to be movable with respect to a fixed rear section of the main wing arranged behind it in the direction of flow in order to vary the size of the flow inlet.

However, the claimed wing arrangement according to claim 7 also has the stated advantages if, viewed in a vertical cross-section along the flow direction, a length of a section of the slat extending forwards beyond a length of the main wing opposite the flow direction is not at least 20% of a total length of the wing arrangement, but less, or if a nose of the main wing formed on a front section of the main wing in the flow direction is not designed to be movable with respect to a fixed rear section of the main wing arranged behind the nose in the flow direction, but is fixed.

It is therefore particularly preferable that the rear section of the slat in the direction of flow protrudes in the direction of flow over an upper side of a fixed section of the main wing. If the main wing has a movable nose, this is arranged below the slat.

To this end, it is proposed that a length (B) of the slat minus a length (D) of a section of the slat extending forwards opposite the flow direction beyond the length (A) of the main wing is at least 5%, preferably at least 10%, particularly preferably at least 15% of a length (C) of the entire wing arrangement.

According to a preferred embodiment of the invention, it is proposed that the slat is fixedly attached to a fixed portion of the main wing. The dimensions of the air gap between the slat and the main wing thus always remain constant, preferably even if the main wing has a movable nose.

Alternatively, however, it would also be conceivable for the slat to be attached to the fixed section of the main wing so that it can move about an axis that runs essentially transverse to the direction of flow (or parallel to a longitudinal extension of the wing arrangement). However, the slat is not moved relative to the fixed section of the main wing in order to vary the dimensions of the air gap between the slat and the main wing, but only to slow down the aircraft by raising the slat after it has touched down on the ground during landing (aerodynamic braking after landing). The flight characteristics of an aircraft during take-off or landing must not be influenced by the movement of the slat.

According to a preferred further embodiment of the invention, it is proposed that a fan, in particular a radial fan, is associated with the gap, which is designed to amplify an airflow flowing through the gap in the direction of flow. An axis of rotation of the fan preferably runs approximately parallel to a longitudinal extension of the wing arrangement. The fan is preferably switched on during slow flight, i.e., during take-off and/or landing of an aircraft. In this way, the required speed of an aircraft during take-off and landing, and thus the required length of a runway, can be further reduced. For pure gliders, the fan can also be used as a so-called range extender, e.g., when the thermals weaken or stop completely. The fan is preferably located on the underside of the slat.

It is also proposed that the fan is driven by an electric motor that draws energy from an electrical energy storage device, in particular a rechargeable battery or a capacitor. The energy storage device can be installed on board an aircraft. It is conceivable that the energy storage device is charged using solar cells. The solar cells can be arranged on the surfaces of the wing assembly and/or the fuselage or other tail unit of the aircraft. In this way, the fan can be operated autonomously (without supplying additional energy from outside the aircraft).

The wing arrangement according to the invention can be used for a variety of applications. In particular, it is proposed that the wing arrangement is designed as a wing of an aircraft, as a rotor blade of a main and/or secondary rotor of a helicopter or as a rotor blade of a rotor of a wind turbine. In these applications, the special features and advantages of the wing arrangement according to the invention are particularly evident. This also applies in a rigid configuration (without a movable nose; fixed reference slat to main wing) as a propeller for piston or turboprop aeroplanes.

To this end, the present invention also relates to an aircraft with wings, a helicopter with a main and/or secondary rotor with rotor blades or a wind turbine with a rotor with rotor blades, wherein the wings of the aircraft or the rotor blades of the helicopter or the wind turbine are designed as a wing arrangement according to the invention of the type described above.

Further features and advantages of the present invention are explained in more detail below with reference to the figures. Each of the features shown in the figures may be essential to the invention on its own, even if this is not shown in the figures and not expressly mentioned in the description. It is also conceivable that several of the features shown in the figures can be combined with one another in any desired manner, even if such a combination is not shown in the figures and is not expressly mentioned in the description. The figures show FIG. 1 a wing arrangement according to the invention according to a first preferred embodiment.

Figure 1:
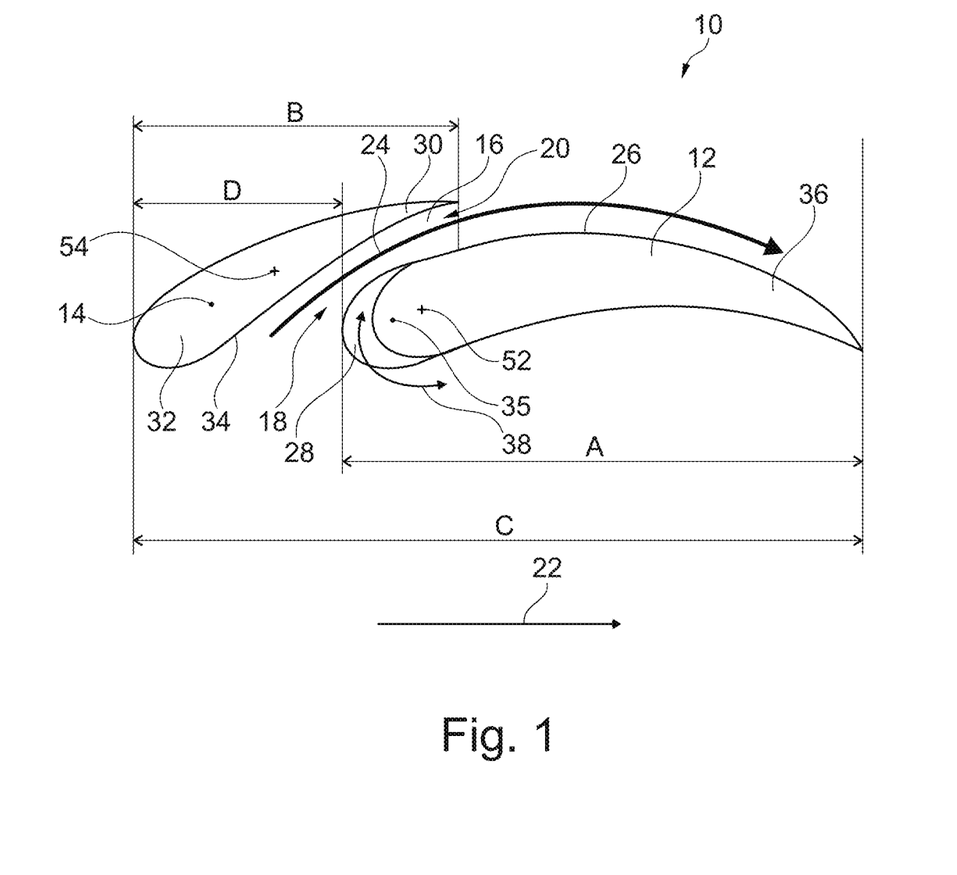

FIG. 1 shows a schematic view in a vertical cross-section of a wing arrangement 10 according to the invention in a first preferred embodiment. The wing arrangement 10 comprises a main wing 12 and a slat 14 attached thereto opposite a flow direction 22 in front of the main wing 12. A gap 16 with a flow inlet 18 and a flow outlet 20 is formed between the slat 14 and the main wing 12. The vertical cross-section extends substantially perpendicular to a longitudinal extension of the wing arrangement 10 and along the flow direction 22 of an air flow 24 flowing through the gap 16 during operation of the wing arrangement 10.

In order to provide a simple and cost-effective way of accelerating an air flow 24 flowing in the flow direction 22 on an upper side 26 of the main wing 12, but without at the same time excessively increasing the air resistance of the wing arrangement 10, it is proposed that, in the vertical cross-section viewed along the flow direction 22, a length D of a section 32 of the slat 14 extending forwards beyond a length A of the main wing 12 opposite the flow direction 22 is at least 20% of a total length C of the wing arrangement 10 in the flow direction 22.

Thus, the following relationship applies to the wing arrangement 10 according to the invention:

$$D \geq (0.2 \times C)$$

This can be achieved by the slat 14 having a relatively long extension B in the direction of flow 22 compared to known wing arrangements. In particular, the slat 14 extends opposite the direction of flow 22 so far beyond a front section 35 of the main wing 12 that the length D of the section of the slat 14 extending forwards opposite the direction of flow 22 beyond the length A of the main wing 12 is at least 20% of the total length C of the wing arrangement 10, comprising the main wing 12 and the slat 14, in the direction of flow 22.

The configuration of the wing arrangement 10 according to the invention leads to a particularly strong acceleration of the air flow 24 on the upper side 26 of the main wing 12. As a result, the main wing 12 can be made thinner in the vertical cross-section along the flow direction 22, which in turn leads to a lower air resistance. The profile of the main wing 12 can be made narrower in the vertical cross-section. In addition, the curvature of the main wing 12 can be made smaller than in conventional wing arrangements with a main wing and slat attached to it.

Due to the relatively large dimension B of the slat 14 compared to the wing arrangements known from the prior art and the relatively small dimension A of the main wing 12, a low drag of the wing arrangement 10 and, when using the wing arrangement 10 as a wing for an aircraft, a relatively high cruising speed can be achieved.

Nevertheless, when the wing arrangement 10 is used as a wing for an aircraft, a relatively high lift can be achieved at low speeds, in particular due to a correspondingly high angle of attack, which is particularly advantageous when the aircraft is taking off and landing. There is also a considerable safety aspect: a stall is significantly delayed at lower aircraft speeds, i.e., the stall becomes gentler, if not impossible, as the aircraft can only enter a so-called stall flight—while maintaining the effect of elevator and rudder.

Viewed in the vertical cross-section along the direction of flow 22, the slat 14 preferably extends relatively far over the main wing 12. In the example shown, a rear section 30 of the slat 14, which extends over the main wing 12, results from the difference between the length B of the slat in the direction of flow 22 and the length D of the front section 32 of the slat 14, which projects forwards over the main wing 12 opposite the direction of flow 22.

Unlike in the prior art, where the known slats are arranged only in front of a front section of the main wing, in the invention the slat 14 is also arranged in front of (opposite the flow direction 22) the front section 35 of the main wing 12, but it extends with its rear section 30 up to above the front section 35 of the main wing 12. In particular, the flow outlet 20 is formed between the upper side 26 of the main wing 12 and a lower side 34 of the slat 14. To this end, it is proposed that, viewed in the vertical cross-section along the flow direction 22, the sum of a length B of the slat 14 in the flow direction 22 and the length A of the main wing 12 is greater than the total length C of the wing arrangement 10 in the flow direction 22. The total length C is shorter than the sum A+B of the lengths of the main wing 12 and slat 14, since the slat 14 is arranged at least partially above the main wing 12 or overlaps the latter.

The following relationship therefore also preferably applies to the wing arrangement 10 according to the invention:

$$C < (A+B)$$

It is further proposed that, viewed in the vertical cross-section along the direction of flow 22, the length B of the slat 14 in the direction of flow 22 is at least 50% of the length A of the main wing 12 in the direction of flow 22. Preferably, the length B of the slat 14 viewed in flow direction 22 is between 50% and 80% of the length A of the main wing 12.

Thus, the following relationship preferably also applies to the wing arrangement 10 according to the invention:

$$B \geq (0.5 \times A), \text{ and/or}$$

$$(0.5 \times A) \leq B \leq (0.8 \times A)$$

It is further suggested that a length B of the slat 14 minus a length D of a section 32 of the slat 14 extending forwards opposite the flow direction 22 beyond the length A of the main wing 12 is at least 5%, preferably at least 10%, particularly preferably at least 15% of the total length C of the entire wing arrangement 10. The following relationship therefore applies:

$$(B-D) \geq (0.05 \times C).$$

In the example of FIG. 1, the front section 35 of the main wing 12 is preferably fixed, i.e., not movable. However, it would also be conceivable that a nose 28 of the main wing 12 formed on the front section 35 of the main wing 12 opposite to the flow direction 22 is designed to be movable with respect to a fixed rear section 36 of the main wing 12 arranged behind the nose 28 in the flow direction 22.

The nose 28 is preferably rotatable about an axis 52 which runs approximately parallel to the longitudinal extension of the wing arrangement 10. The axis of rotation 52 can also be arranged at any position other than that shown in the figures. Moving the nose 28 causes the nose 28 to be lowered or raised or the flow inlet 18 to be enlarged or reduced. The possibility of moving the nose 28 of the main wing 12 is indicated in FIG. 1 by a double arrow 38. The movement of the nose 28 of the main wing 12 is explained in more detail below with reference to FIGS. 2-4.

The wing arrangement 10 can also be designed in such a way that, viewed in the vertical cross-section along the direction of flow 22, the length D of the section 32 of the slat 14 extending forwards beyond the length A of the main wing 12 in the opposite direction to the direction of flow 22 is at least 20% of the total length C of the wing arrangement 10 in the direction of flow 22.

However, a wing arrangement 10 with a movable nose 28 also has the stated advantages if, viewed in the vertical cross-section along the flow direction 22, the length D of the section 32 of the slat 14 extending forwards opposite the flow direction 22 beyond the length A of the main wing 12 is not at least 20% of the total length C of the wing arrangement 10, but less.

It is further proposed that during movement of the nose 28 of the main wing 12, the size of the flow outlet 20 remains unchanged. In particular, the size of the flow outlet 20 is referred to as the distance between the lower side 34 of the slat 14 and the upper side 26 of the main wing 12 at the rear section 30 of the slat 14 in the flow direction 22. The distance is preferably measured in the vertical cross-section through the wing arrangement 10, as shown in FIG. 1. In other words, the gap 16 always remains the same regardless of the movement of the nose 28 of the main wing 12.

Figure 2:
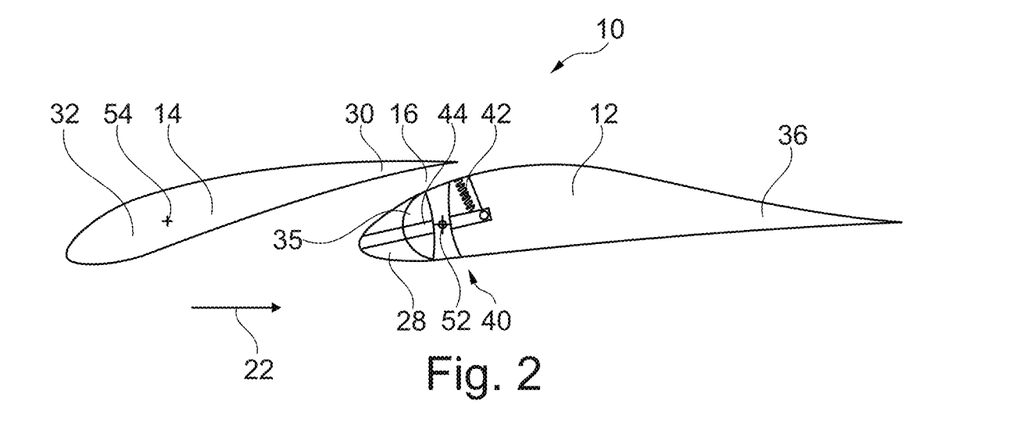
FIG. 2 a wing arrangement according to the invention according to a further preferred embodiment in a first position.
Figure 3:
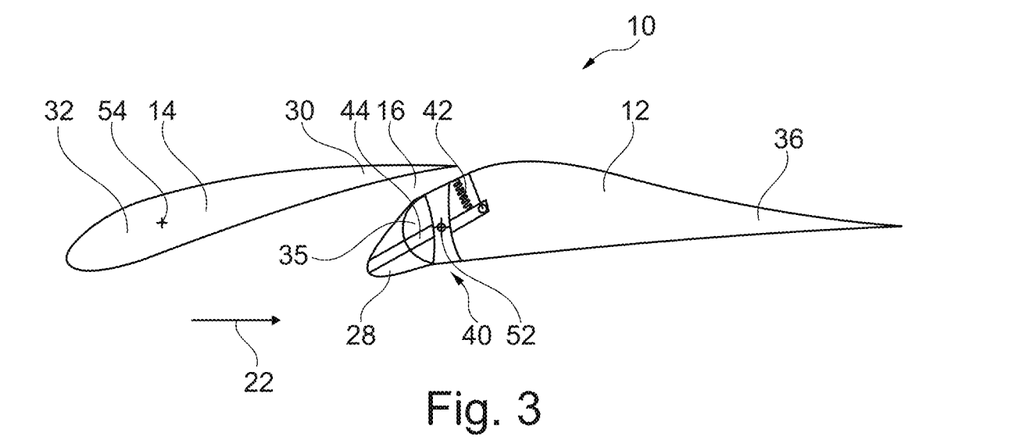
FIG. 3 the wing arrangement according to the invention from FIG. 2 in a second position.
Figure 4:
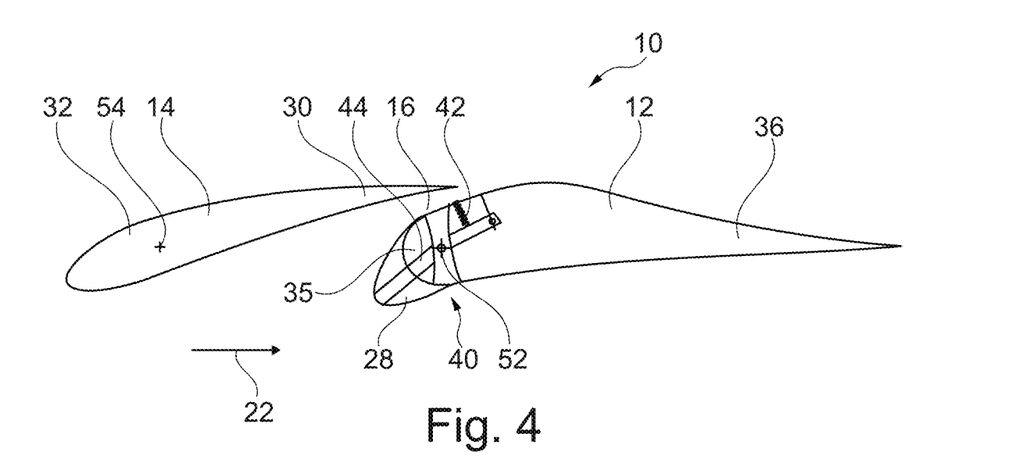
FIG. 4 the wing arrangement according to the invention from FIG. 2 in a third position.

FIGS. 2-4 show different positions of the movable nose 28 of the main wing 12. In FIG. 2, the nose 28 is shown at an angle of 0° (i.e., fully raised). In FIG. 3, the nose 28 is shown lowered by an angle of 15°. In FIG. 4, the nose 28 is shown lowered by an angle of 25°. The position shown in FIG. 4 can correspond to a fully lowered nose 28. However, it is also conceivable that the nose 28 can be lowered further beyond 25°.

To move the nose 28, an adjustment mechanism 40 can be provided in the main wing 12, which comprises a preferably electric or electromagnetic actuator (not shown), a spring element 42 and an adjustment linkage 44. The spring element 42 ensures that the nose 28 returns to the fully raised position shown in FIG. 2 after the actuator is switched off or malfunctions.

As can be clearly seen from FIGS. 2-4, the upper side 26 of the main wing 12 always has a continuous course in the vertical cross-section along the flow direction 22, regardless of the position of the nose 28. By moving the nose 28, merely the Bernoulli effect in the gap 16 between the slat 14 and the main wing 12 is varied, i.e., increased when the nose 28 is lowered (see FIG. 4) and reduced when the nose 28 is retracted (see FIG. 2).

It is further proposed that in the wing arrangement 10, the rear section 30 of the slat 14 in the flow direction 22 is arranged above the fixed section 36 of the main wing 12. If the main wing 12 has a movable nose 28, the fixed portion is the rear portion 36 of the main wing 12. If the main wing 12 does not have a movable nose 28, the fixed portion is formed by the entire main wing 12, for example in rotor or propeller applications. This does not apply to wind turbine rotors, as these are passively driven. Nor does it apply to aeroplane wings.

In the wing arrangement 10, in which the rear section 30 of the slat 14 is arranged above the fixed section 36 of the main wing 12, the wing arrangement 10 can also be designed such that, viewed in the vertical cross-section along the flow direction 22, the length D of the section 32 of the slat 14 extending forwards beyond the length A of the main wing 12 opposite the flow direction 22 is at least 20% of a total length C of the wing arrangement 10 in the flow direction 22. Furthermore, this wing arrangement 10 can also be designed such that the nose 28 of the main wing 12 formed on the front section 35 of the main wing 12 in the flow direction 22 is designed to be movable with respect to the fixed rear section 36 of the main wing 12 arranged behind the nose 28 in the flow direction 22 in order to vary the size of the flow inlet 18.

However, this wing arrangement 10, in which the rear section 30 of the slat 14 is arranged above the fixed section 36 of the main wing 12, also has the stated advantages if, viewed in the vertical cross-section along the flow direction 22, the length D of the section 32 of the slat 14 extending forwards beyond the length A of the main wing 12 opposite the flow direction 22 is not at least 20% of the total length C of the wing arrangement 10, but less, or if the nose 28 of the main wing 12, which is formed on the front section 35 of the main wing 12 in the direction of flow 22, is not movable with respect to the rear section 36 of the main wing 12, which is arranged behind the nose 28 in the direction of flow 22, but is fixed.

Particularly preferably, therefore, the rear section 30 of the slat 14 in the flow direction 22 projects beyond the upper side 26 of the fixed section 36 of the main wing 14 in the flow direction 22. If the main wing 12 has a movable nose 28, this is arranged below the slat 14, so that the flow inlet 18 of the gap 16 is formed therebetween.

Preferably, the slat 14 is fixedly attached to the fixed section 36 of the main wing 12. The dimensions of the air gap 16 or the flow outlet 20 between the slat 14 and the main wing 12 thus always remain constant, preferably even if the main wing 12 has a movable nose 28.

Alternatively, however, it would also be conceivable that the slat 14 is attached to the fixed section 36 of the main wing 12 in a manner movable about an axis 54 extending substantially transversely to the flow direction 22 (or parallel to the longitudinal extension of the wing arrangement 10). The axis 54 can also be arranged at any position other than that shown in the figures. In particular, the axis 54 can also extend outside the cross-section of the slat. Preferably, the slat 14 is not moved in respect to the main wing 12 in order to vary the dimensions of the air gap 16 or the flow outlet 20 between the slat 14 and the main wing 12, but only to additionally slow down the aircraft after it has touched down on the ground by raising the slat 14. The flight characteristics of the aircraft during take-off or landing are preferably not influenced by the movement of the slat 14, and/or the slat 14 is only moved after landing when the aircraft has already touched down on the ground.

Figure 5:
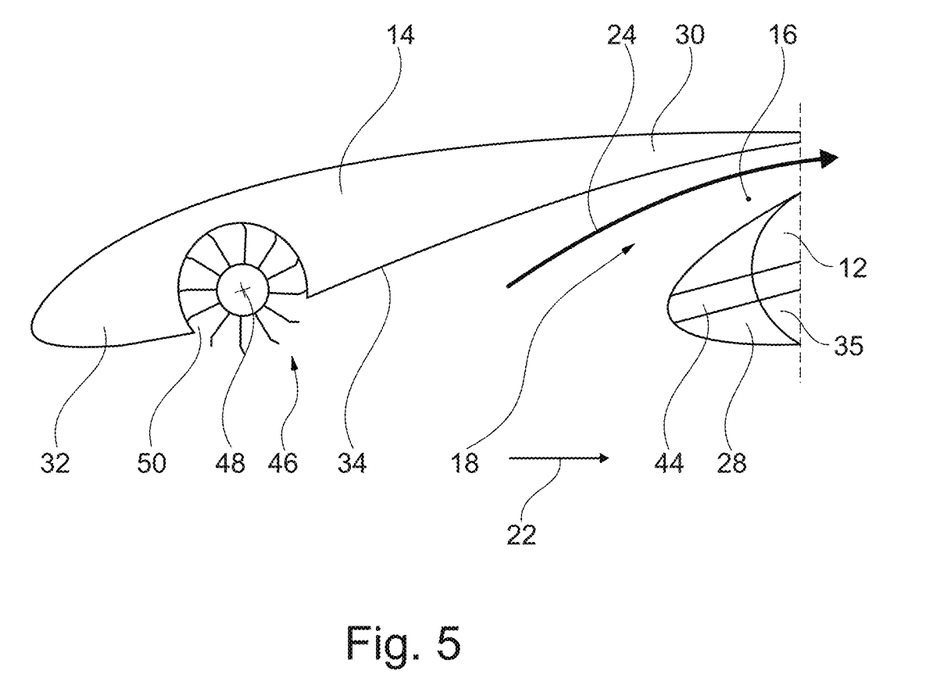
FIG. 5 a wing arrangement according to the invention according to a further preferred embodiment.

In the embodiment shown in FIG. 5, a fan 46, in particular a radial fan, can be assigned to the gap 16 or the flow inlet 18, which is designed to amplify the air flow 24 flowing through the gap 16 in the flow direction 22. An axis of rotation 48 of the fan 46 preferably runs approximately parallel to the longitudinal extension of the wing arrangement 10. In the example of FIG. 5, the radial fan 46 is arranged in a longitudinal recess 50 on the lower side 34 of the slat 14. Of course, any other type of fan 46 can also be used to accelerate the air flow 24 in the gap 16 as required or desired.

The blower 46 is preferably switched on during slow flight, i.e., during take-off and/or landing of the aircraft. In this way, the required speed of the aircraft during take-off and landing, and thus the required length of a runway, can be further reduced. For pure gliders, the fan 46 can also be used as a so-called range extender, e.g., when the thermals decrease or stop completely, in order to increase the lift and extend the range.

The fan 46 can be driven by an electric motor (not shown), which draws energy from an electrical energy storage device (not shown), in particular a rechargeable battery or a capacitor. The energy storage device can be installed on board the aircraft. It is conceivable that the energy storage device is charged using solar cells. The solar cells can be arranged on the surfaces of the wing assembly 10, preferably the upper side of the slat 14 and/or the upper side 26 of the main wing 12, and/or on the fuselage or another tail unit of the aircraft. In this way, the fan 46 can be operated autonomously (without supplying additional energy from outside the aircraft).

The wing arrangement 10 according to the invention can be used for a variety of applications. In particular, it is proposed that the wing arrangement 10 is designed as a wing of an aircraft, as a rotor blade of a main and/or secondary rotor of a helicopter or as a rotor blade of a rotor of a wind turbine. It would also be conceivable to use the invention in a main rotor and in a rigid configuration in a propeller of a gyrocopter. It could also be used as a propeller for motor- and turbine-powered fixed-wing aircraft, in this case with a fixed gap arrangement, i.e., without a movable nose. The specific features and advantages of the wing arrangement according to the invention are particularly evident in all these applications.

The invention claimed is:

1. A wing arrangement (10) comprising a main wing (12) and a slat (14) attached thereto opposite a flow direction (22) in front of the main wing (12), wherein a gap (16) with a flow inlet (18) and a defined flow outlet (20) is formed between the slat (14) and the main wing (12), wherein in a vertical cross-section viewed along the flow direction (22), a length (D) of a section (32) of the slat (14) extending forwards beyond a length (A) of the main wing (12) opposite the flow direction (22) is at least 20% of a total length (C) of the wing arrangement (10) in the flow direction (22), and a nose (28) of the main wing (12) formed on a front section (35) of the main wing (12) opposite the flow direction (22) is designed to be movable with respect to a fixed rear section (36) of the main wing (12) arranged behind the nose (28) in the flow direction (22) in order to vary the size of the flow inlet (18), wherein the size of the defined flow outlet (20) remains unchanged during the movement of the nose (28) of the main wing (12).

2. The wing arrangement (10) according to claim 1, wherein, viewed in the vertical cross-section along the flow direction (22), the sum of a length (B) of the slat (14) in the flow direction (22) and the length (A) of the main wing (12) is greater than the total length (C) of the wing arrangement (10) in the flow direction (22).

3. The wing arrangement (10) according to claim 2, wherein, viewed in the vertical cross-section along the flow direction (22), a length (B) of the slat (14) in the flow direction (22) is at least 50% of the length (A) of the main wing (12) in the flow direction (22).

4. The wing arrangement (10) according to claim 2, wherein a rear section (30) of the slat (14) in the flow direction (22) is arranged above a fixed section (36) of the main wing (12).

5. The wing arrangement (10) according to claim 2, wherein the slat (14) is fixedly attached to the fixed rear section (36) of the main wing (12).

6. The wing arrangement (10) according to claim 2, wherein the slat (14) is movably attached to the fixed rear section (36) of the main wing (12) about an axis (54) extending substantially transversely to the flow direction (22).

7. The wing arrangement (10) according to claim 2, wherein a fan (46), including a radial fan, is associated with the gap (16), the fan (46) being designed to amplify an air flow (24) flowing through the gap (16) in the flow direction (22).

8. The wing arrangement (10) according to claim 1, wherein, viewed in the vertical cross-section along the flow direction (22), a length (B) of the slat (14) in the flow direction (22) is at least 50% of the length (A) of the main wing (12) in the flow direction (22).

9. The wing arrangement (10) according to claim 1, wherein during the movement of the nose (28) an upper side (26) of the main wing (12) always has a continuous course when viewed in a vertical cross-section along the flow direction (22).

10. The wing arrangement (10) according to claim 1, wherein a rear section (30) of the slat (14) in the flow direction (22) is arranged above a fixed section (36) of the main wing (12).

11. The wing arrangement (10) according to claim 10, wherein a length (B) of the slat (14) minus the length (D) of the section (32) of the slat (14) extending forwards opposite the flow direction (22) beyond the length (A) of the main wing (12) is at least 5%, including at least 10% or 15%, of the total length (C) of the wing arrangement (10).

12. The wing arrangement (10) according to claim 1, wherein the slat (14) is fixedly attached to the fixed rear section (36) of the main wing (12).

13. The wing arrangement (10) according to claim 1, wherein the slat (14) is movably attached to the fixed rear section (36) of the main wing (12) about an axis (54) extending substantially transversely to the flow direction (22).

14. The wing arrangement (10) according to claim 1, wherein a fan (46), including a radial fan, is associated with the gap (16), the fan (46) being designed to amplify an air flow (24) flowing through the gap (16) in the flow direction (22).

15. The wing arrangement (10) according to claim 14, wherein the fan (46) is operated by an electric motor which draws energy from an electrical energy store, including a rechargeable battery or a capacitor.

16. The wing arrangement (10) according to claim 14, wherein the fan (46) is arranged on a lower side (34) of the slat (14).

17. The wing arrangement (10) according to claim 1, wherein the wing arrangement (10) is designed as a wing of an aircraft.

18. An aeroplane with wings, wherein the wings of the aeroplane are designed as the wing arrangement (10) according to claim 1.

19. The wing arrangement (10) according to claim 1, wherein a rear section (30) of the slat (14) in the flow direction (22) overlaps the fixed rear section (36) of the main wing (12).

20. A wing arrangement (10) in the form of a propeller blade of a propeller of a fixed-wing aircraft or a gyroplane or in the form of a rotor blade of a main or secondary rotor of an aircraft with wings, a helicopter or a gyroplane or in the form of a rotor blade of a rotor of a wind turbine, wherein in a vertical cross-section viewed along a flow direction (22), a length (D) of a section (32) of a slat (14) extending forwards beyond a length (A) of a main wing (12) opposite the flow direction (22) is at least 20% of a total length (C) of the wing arrangement (10) in the flow direction (22).

21. A wing arrangement (10) comprising a main wing (12) and a slat (14) attached thereto opposite a flow direction (22) in front of the main wing (12), wherein a gap (16) with a flow inlet (18) and a defined flow outlet (20) is formed between the slat (14) and the main wing (12), wherein the main wing (12) comprises a fixed rear section (36) and a front section (35), and wherein a nose (28) of the main wing (12) formed on the front section (35) of the main wing (12) opposite the flow direction (22) is at least 20% of a total length (C) of the wing arrangement (10) designed to be movable with respect to the fixed rear section (36) of the main wing (12) arranged behind the nose (28) in the flow direction (22) in order to vary the size of the flow inlet (18), wherein the size of the defined flow outlet (20) remains unchanged during the movement of the nose (28) of the main wing (12).

* * * * *